(12) United States Patent
Holm et al.

(10) Patent No.: US 11,478,708 B1
(45) Date of Patent: Oct. 25, 2022

(54) SYSTEM AND METHOD FOR THE CONSTRUCTION OF INTERACTIVE VIRTUAL OBJECTS

(71) Applicant: LEGO A/S, Billund (DK)

(72) Inventors: Anders Tankred Holm, Billund (DK); Rasmus Bjørndal Harr, Billund (DK); Nicolaas Johan Bernardo Vás, Billund (DK); Mads Beck Purup, Aarhus (DK); Brian Bunch Christensen, Aarhus (DK); Niels Bross, Aarhus (DK)

(73) Assignee: LEGO A/S, Billund (DK)

( * ) Notice: Subject to any disclaimer, the term of this patent is extended or adjusted under 35 U.S.C. 154(b) by 10 days.

(21) Appl. No.: 17/229,318

(22) Filed: Apr. 13, 2021

(51) Int. Cl.
    *A63F 13/577* (2014.01)
    *A63F 13/5375* (2014.01)
    *G06F 3/04815* (2022.01)

(52) U.S. Cl.
    CPC ........ *A63F 13/577* (2014.09); *A63F 13/5375* (2014.09); *G06F 3/04815* (2013.01)

(58) Field of Classification Search
    CPC ................ A63F 13/577; A63F 13/5375; A63F 2300/6653; G06F 3/04815
    USPC ...................................................... 463/9, 31
    See application file for complete search history.

(56) References Cited

U.S. PATENT DOCUMENTS

| | | | | |
|---|---|---|---|---|
| 6,352,475 B1* | 3/2002 | Mraovic | ............... | G09B 23/28 463/9 |
| 6,458,032 B1* | 10/2002 | Yamagami | ............ | A63F 9/0612 463/9 |
| 7,480,597 B2* | 1/2009 | Clark | .................. | G06Q 10/087 703/2 |
| 7,596,473 B2* | 9/2009 | Hansen | .................. | G06Q 10/06 446/85 |
| 8,277,318 B2 | 10/2012 | Baszucki | | |
| 8,313,370 B2* | 11/2012 | Rogers | .................... | A63F 13/80 463/7 |
| 8,721,413 B2* | 5/2014 | Mohammed | .............. | A63F 9/10 463/9 |
| 8,839,153 B2 | 9/2014 | Baszucki | | |
| 9,773,074 B2 | 9/2017 | Balon et al. | | |
| 2005/0043075 A1* | 2/2005 | Lin | ........................ | A63F 13/80 463/9 |

* cited by examiner

*Primary Examiner* — Allen Chan
(74) *Attorney, Agent, or Firm* — Day Pitney LLP; George N. Chaclas

(57) ABSTRACT

The present invention relates to a system and method for constructing an interactive virtual object in a virtual environment implemented in a computer, wherein the computer comprises one or more input devices and one or more output devices providing a user interface allowing a user to interact with the virtual environment, wherein the virtual environment comprises a first virtual construction element carrying a first interactive behavior and a second virtual construction element not carrying the first interactive behavior, wherein the first and second virtual construction elements are connectable to each other by means of a coupling mechanism to form a combined virtual object, and wherein the first virtual construction element imparts the first interactive behavior to the combined virtual object when the first and second construction elements are connected to each other.

21 Claims, 5 Drawing Sheets

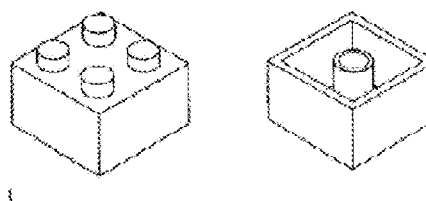
FIG. 1 - PRIOR ART
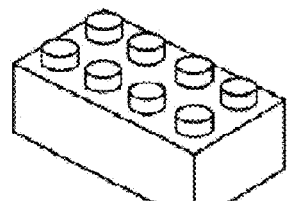
FIG. 2
PRIOR ART
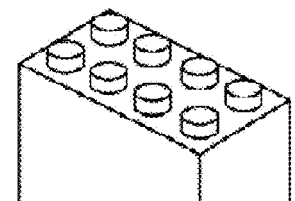
FIG. 3
PRIOR ART
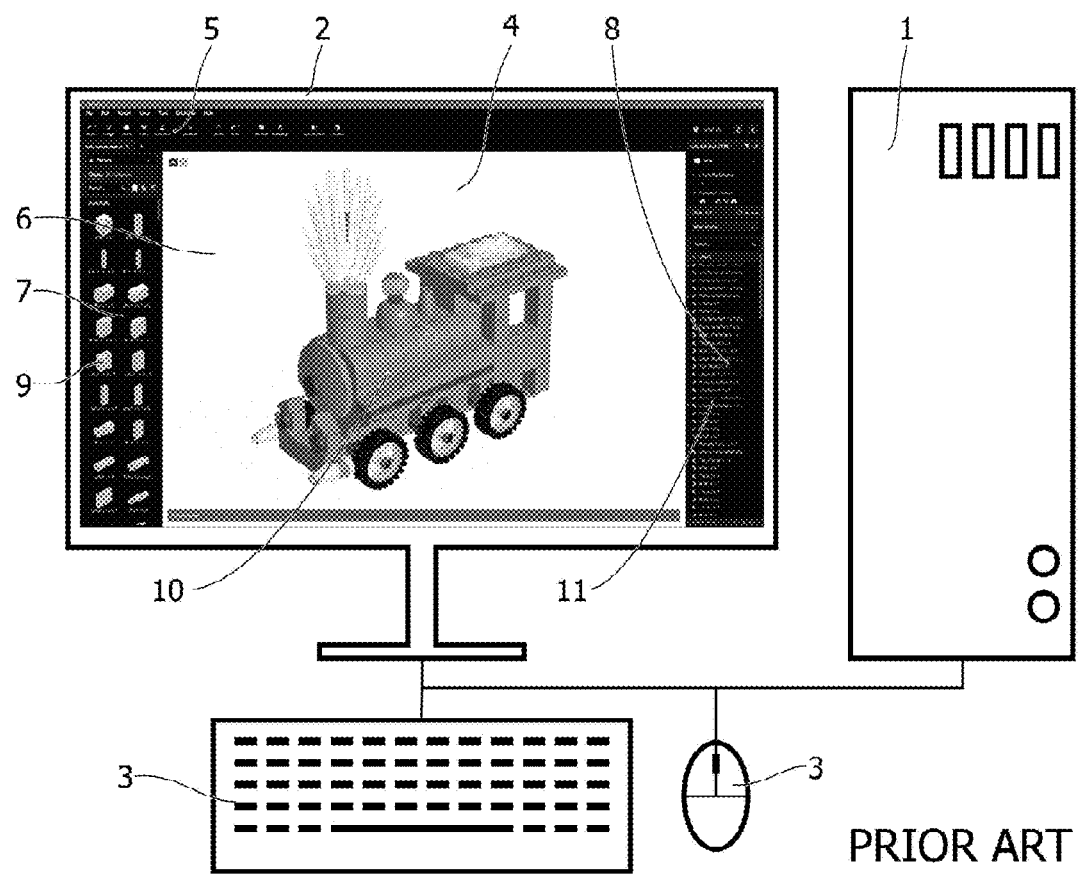
PRIOR ART
Fig. 4

SYSTEM AND METHOD FOR THE CONSTRUCTION OF INTERACTIVE VIRTUAL OBJECTS

The invention relates in one aspect to a system for constructing an interactive virtual object from other virtual objects, such as constructing an interactive virtual toy construction model from virtual toy construction elements. In a particular aspect, the invention provides an improvement over known systems for constructing virtual toy construction models by facilitating the construction of interactive virtual toy construction models. In a further particular aspect, the invention relates to a video game system for the construction of and interaction with virtual objects in a virtual world environment. In a further aspect, the invention relates to a game creation system for the creation of video games involving the construction and interaction with virtual objects in a virtual world environment. In a yet further aspect, the invention relates to a method of constructing interactive virtual objects in a virtual world environment.

BACKGROUND OF THE INVENTION

Modular toy systems and, in particular, modular toy construction systems have been known for decades. In particular, toy construction systems comprising toy construction elements having coupling members for detachably interconnecting construction elements with each other in order to build toy construction models have gained high popularity. Well known toy construction systems include, for example, brick-shaped building blocks with coupling members of the stud and cavity type providing a reliable friction engagement coupling for building toy construction models at all levels of complexity, thereby allowing for an engaging play experience that can be adapted to suit all ages of users. Modular toy construction systems are often valued for their high level of flexibility facilitating a creative play experience—both when constructing toy construction models and when playing with the finished models.

There is a general desire to bring the highly flexible and engaging play experience facilitated by physical toy construction systems into the virtual world. In this regard, programs are being developed that enable users to virtually construct models from virtual construction elements, for example in order to easily inspect models prior to physical model building, to minimize trials and errors in model building, or to be able to easily create and share toy construction sets with instructions for building physical toy construction models. However, it is still desirable to enhance the educational and play value of virtual toy systems. For example, it is desirable to enhance the interactive nature of the constructed models in order to enhance the play experience of the virtual toy construction systems. It is further desirable to provide a virtual toy system that stimulates a creative building and play experience that is suitable for children without a detailed understanding of programming techniques, control systems, or the like. Yet further, it is desirable to provide an interactive play experience that can be configured and re-configured by the user to allow for a variety of different interactive play experiences. In particular, it is desirable to facilitate an easy way of creating, configuring, and re-configuring an interactive play experience.

Therefore there is still a need for new and/or improved systems for the creation of interactive virtual objects.

SUMMARY OF THE INVENTION

In one aspect a system for constructing an interactive virtual model is provided, the system comprising a processing unit, one or more output devices, and one or more input devices, wherein the processing unit is operatively coupled to the input and output devices so as to provide a user interface to a user of the system. The processing unit may comprise a processor device and memory means, the memory means comprising programmed instructions, which when executed by the processor device cause the system to produce an interactive virtual environment configured to allow the user to interact with the virtual environment through the user interface. The virtual environment may comprise a plurality of virtual construction elements, wherein the virtual construction elements are connectable to each other so as to construct a virtual model. A first one of the virtual construction elements carries a first interactive behavior, wherein the first virtual construction element is configured to receive a stimulus and to generate a response responsive to receiving said stimulus according to a first response function, a second one of the virtual construction elements does not carry the first interactive behavior, and the first virtual construction element is configured, or at least configurable, to impart the first interactive behavior to the second virtual construction element when the first and second construction elements are connected to each other.

In a further aspect, a system for constructing an interactive virtual object in a virtual environment implemented in a computer is provided, the computer comprising one or more input devices and one or more output devices allowing a user to interact with the virtual environment. The virtual environment may comprise a first virtual construction element carrying a first interactive behavior, and a second virtual construction element not carrying the first interactive behavior, wherein the first and second virtual construction elements are connectable to each other by means of a coupling mechanism to form a combined virtual object, and wherein the first virtual construction element imparts the first interactive behavior to the combined virtual object when the first and second construction elements are connected to each other.

Virtual construction elements may be directly or indirectly connected to each other. Virtual construction elements are considered as directly connected to each other when a coupling mechanism is directly engaged between the connected virtual construction elements, e.g. by means of cooperating coupling members arranged on the virtual construction elements that are engaged to each other so as to couple the virtual construction elements together. Direct connection typically requires that the directly connected first and second virtual objects are directly adjacent to each other.

Indirect connection does not require that the first and second virtual objects are directly adjacent to each other, i.e. they may or may not be directly adjacent to each other. However, coupling members of indirectly connected elements are not directly engaged with each other. Instead, indirectly connected elements are connected to each other via intermediate directly connected elements, i.e. through an uninterrupted path of direct connections.

The term interactive behavior as used herein is understood as the functionality of a virtual object that causes generation of an output signal responsive to an input signal received by the virtual object, wherein the input signal may be referred to as 'stimulus', and the output signal may be referred to as 'response'. The response is determined by a response function on the basis of the received stimulus. A virtual object carrying an interactive behavior is thus configured to receive a stimulus at a stimulus input, and to generate a response at a response output, responsive to receiving said stimulus.

An interactive virtual object may be an interactive virtual toy construction element or an interactive virtual toy construction model constructed from virtual toy construction elements. Using embodiments of the invention, a virtual toy construction element or model not exhibiting any interactive behavior may be converted into an interactive virtual toy construction model by connecting an interactive virtual toy construction element to the model, and thus imparting the interactive behavior as defined and configured by the interactive virtual toy construction element to the resulting model. Furthermore, using embodiments of the invention the interactive behavior of an interactive virtual toy construction model may be modified by adding, removing, or replacing interactive virtual toy construction elements in the model. Furthermore, the interactive behavior of the interactive virtual toy construction elements in an interactive virtual toy construction model may be configurable. Thereby, the interactive behavior of the virtual toy construction model comprising configurable interactive toy construction elements may be modified accordingly.

In some embodiments, the second one of the virtual construction elements carries a second interactive behavior, wherein the second virtual construction element is configured to receive a stimulus and to generate a response responsive to receiving said stimulus according to a second response function. In some embodiments, the stimulus input of a first interactive virtual toy construction element may be configurable to receive a stimulus from the response output of another interactive virtual toy construction element, so as to stimulate the response of the first interactive virtual toy construction element, via the response of the second virtual interactive toy construction element, by stimulating the second virtual interactive toy construction element. The second response output of the second interactive toy construction element may thus be linked to the first stimulus input of the first interactive toy construction element. Thereby, a new interactive virtual behavior may be constructed from two or more interactive virtual toy construction elements that are linked to each other.

According to some embodiments, a link between two or more interactive virtual toy construction elements may be configured to be determined according to direct and/or indirect connectivity. For example, a response output may be configured to affect the stimulus input of all directly and indirectly connected interactive virtual toy construction elements, only directly connected interactive virtual toy construction elements, only indirectly connected interactive virtual toy construction elements, and/or selected ones of the directly and indirectly connected interactive virtual toy construction elements. Furthermore, a stimulus input of one interactive virtual construction element may be linked to the response output of all directly and indirectly connected interactive virtual toy construction elements, only directly connected interactive virtual toy construction elements, only indirectly connected interactive virtual toy construction elements, and/or selected ones of the directly and indirectly connected interactive virtual toy construction elements. Thereby, a new interactive behavior of the virtual toy construction model comprising the linked interactive toy construction elements may be constructed accordingly.

According to some embodiments, a link between two or more virtual toy construction elements may be configured independent of connectivity. For example, the stimulus input of a first interactive virtual toy construction element may be linked to the response output of a second interactive virtual toy construction element in a second interactive virtual toy construction model separate from the first interactive virtual toy construction model. The interactive behavior of the first and second interactive virtual toy construction models may thus be linked to each other. More generally, a new interactive virtual behavior may thus be constructed from two or more interactive virtual toy construction models that are linked to each other. Thereby an interactive virtual world with interactive virtual objects having a linked interactive behavior may be built in an easily accessible and intuitive manner. This is particularly useful for the creation of games in the virtual environment, with challenging interactive tasks for a player to solve.

Advantageously, interactive steps of constructing, configuring, and/or linking the interactive behaviors of elements and models in the virtual environment may be performed by a user of the system, e.g. in a building operational mode. Thereby, the user may modify the interactive experience of a player when the player is playing with the elements and models in the virtual environment, e.g. in a playing operational mode. In some embodiments, interactive virtual toy construction elements and/or models may be provided by the system with a pre-configured interactive behavior. Thereby providing a low barrier entrance to using the system and improving the user experience for unexperienced users, such as younger children. According to some embodiments, the second virtual construction element may also impart the second interactive behavior to the first virtual construction element when the first and second construction elements are connected to each other, in particular when the second interactive behavior is different from the first interactive behavior.

Advantageously, each of the virtual construction elements comprises one or more coupling members for connecting two or more virtual construction elements to each other. Thereby, a coupling mechanism is defined for connecting said virtual construction element to one or more cooperating virtual construction elements, so as to construct a virtual construction model. A virtual construction model may be defined as a group of connected virtual construction elements and information defining the relative positions and connectivity of the virtual construction elements in the group with respect to each other.

The virtual environment may provide a plurality of virtual construction elements, which comprises a set of passive virtual construction elements adapted for virtual model building, the passive virtual construction elements not carrying an interactive behavior. The virtual environment may further provide a plurality of virtual construction elements, which comprises a set of interactive virtual construction elements adapted for virtual model building, each of the interactive virtual construction elements carrying a respective interactive behavior. The interactive virtual construction elements may comprise action elements, each action element carrying a respective action behavior configured to produce a user-perceptible output at the user interface in response to a stimulus received at the stimulus input of the action element. The interactive virtual construction elements may further comprise trigger elements, each trigger element carrying a respective trigger behavior configured to produce a trigger event or state at the response output of the trigger element in response to a stimulus received at the stimulus input of the trigger element.

In a yet further aspect, a method for constructing an interactive virtual object in a virtual environment is provided. The virtual environment may be implemented in a computer arrangement, the computer arrangement being adapted to provide a user interface allowing a user to interact with the virtual environment. The method may comprise steps of:

provide a first virtual object carrying a first interactive behavior, wherein the first virtual object is configured to receive a stimulus and to generate a response responsive to receiving said stimulus according to a first response function;

providing a second virtual object not carrying the first interactive behavior, connecting the first and second objects to each other by means of a coupling mechanism to form a combined virtual object; and imparting the interactive behavior of the first virtual object to the combined virtual object when the first and second virtual objects are connected to each other.

In some embodiments, the first virtual object may be one of an interactive virtual construction element and an interactive virtual construction model constructed from a plurality of virtual construction elements including at least one interactive virtual construction element. In some embodiments, the second virtual object may be a virtual construction model constructed from a plurality of virtual construction elements. In some embodiments, the method may further comprise steps of:

configuring the first virtual object to modify the first interactive behavior; and imparting the modified first interactive behavior to the combined virtual object.

Furthermore, the second virtual object may carry a second interactive behavior, wherein the second virtual object is configured to receive a stimulus and to generate a response responsive to receiving said stimulus according to a second response function. The method may then further comprise steps of linking a response output of the second virtual object as a stimulus to a stimulus input of the first virtual object. Advantageously, steps of constructing, configuring, and/or linking the interactive behaviors of elements and models in the virtual environment may be performed by a user of the system, e.g. in a building operational mode. Thereby, the user may modify the interactive experience of a player playing with the elements and models in the virtual environment, e.g. in a playing operational mode.

BRIEF DESCRIPTION OF THE DRAWINGS

FIGS. 1-3 each show a prior art toy construction element.

FIG. 4 shows a prior art system for building virtual toy construction models.

DETAILED DESCRIPTION

Figure 5:
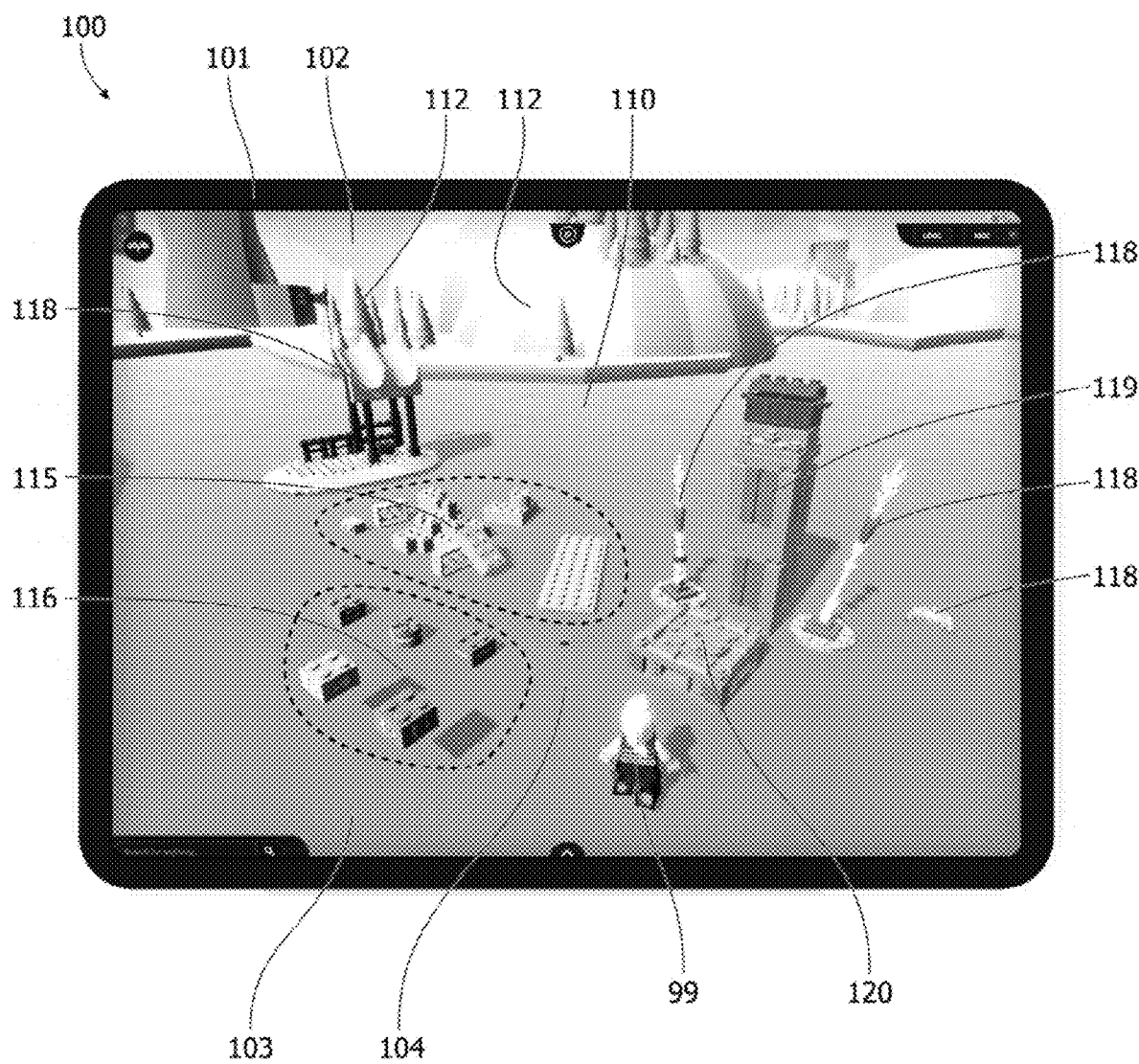
FIG. 5 shows an embodiment of a system for building interactive virtual toy construction models.

Various aspects and embodiments of toy construction systems disclosed herein will now be described with reference to toy construction elements in the form of bricks. However, the invention may be applied to other forms of modular construction elements for use in toy construction sets.

FIG. 1 shows a modular toy construction element with coupling pegs, also called studs, on its top surface and a cavity extending into the brick from the bottom. The cavity has a central tube, and coupling pegs on another brick can be received in the cavity in a frictional engagement as disclosed in U.S. Pat. No. 3,005,282. FIGS. 2 and 3 show other such prior art construction elements. The construction elements shown in the remaining figures have this known type of coupling members in the form of cooperating pegs and cavities. However, other types of coupling members may also be used in addition to or instead of the pegs and cavities. The coupling pegs are arranged in a square planar grid, i.e. defining orthogonal directions along which sequences of coupling pegs are arranged. The distance between neighboring coupling pegs is uniform and equal in both directions. This or similar arrangements of coupling members at coupling locations defining a regular planar grid allow the toy construction elements to be interconnected in a discrete number of positions and orientations relative to each other, in particular at right angles with respect to each other. The toy construction elements shown here, in FIGS. 1-3, are of the passive type, without additional functionality beyond mechanical model building.

Such toy construction elements can also be implemented in a computer as virtual toy construction elements for virtual model building, thereby providing a virtual toy construction system, wherein each virtual construction element has a shape as defined by circumferential surfaces, and wherein each virtual construction element further has one or more coupling members configured to allow coupling connections between cooperating virtual construction elements. The virtual toy construction elements are configured to have the same modularity and coupling properties as the corresponding physical toy construction elements. Thereby, a virtual model building system may be provided, which corresponds to physical model building with a physical toy construction system, and allows for virtual model building, wherein each virtual toy construction model is defined by a set of virtual toy construction elements and information defining their positioning and connectivity with respect to each other.

FIG. 4 shows a prior art virtual toy construction system for virtual model building using virtual toy construction elements. The system includes a processing unit 1, a display unit 2, and input devices 3. The processing unit 1 may comprise, besides a processor, volatile and non-volatile memory, and may further have access to networked resources, such as cloud storage and computing. The processing unit comprises and/or has networked access to programmed instructions, which provide, when executed by the processor, a virtual building environment 4. The virtual building environment may include a command interface 5, a graphics interface 6, a parts library 7, and a configuration interface 8. The parts library 7 may comprise all the virtual toy construction elements 9 available in the virtual building environment 4, or at least sub-sets thereof, e.g. in the form of a palette as seen in FIG. 4. Using one or more of the input devices 3, a user of the virtual toy construction system may select from the available virtual toy construction elements, position the selected toy construction elements with respect to each other in a coordinate system of the virtual building environment, and instruct the system to connect the selected toy construction elements to each other in order to build a virtual toy construction model 10. The toy construction model may be visualized in the graphics interface 6, e.g. as an elevational view. The configuration interface 8 may provide configuration information related to the building process. In particular, the configuration interface may provide textual information on the virtual toy construction model, such as a data structure 11 defining the model 10. The data structure may comprise a complete list of the virtual toy construction elements included in the model 10 and their connectivity.

FIG. 5 shows a system 100 for constructing interactive virtual objects according to one embodiment of the invention. The system 100 has a processing unit 101 comprising a processor device and memory means, output devices 102, such as a display, and input devices 103, such as a touch panel or any suitable other input device. The processing unit 101 is configured to control the display 102 and receive user input from the input device 103. The processing unit 101 further comprises, or has access to, programmed instructions, which when executed by a processor device of the processing unit causes the display 102 to provide an interactive virtual environment 104 to a user. The processing unit 101, output devices 102, and the input devices 103 may be provided in any suitable arrangement as long as the elements of the invention are implemented therein in order to provide the interactive virtual environment 104 to a user communicating with the system through a user interface, e.g. in a standalone computer, in a single housing, such as a mobile phone, tablet computer or other mobile device, in separate housings such as in a desktop computer setup, and/or in a distributed set-up, at different locations, such as by accessing networked computing resources. The processing unit 101 may thus comprise, or have access to, computing resources to retrieve programmed instructions, virtual toy construction library data, virtual environment data, and/or to make use of processing power located remotely from a user interface provided by the display and/or input devices, in order to provide the interactive virtual environment 104 to the user. Suitable input and output devices 102, 103 may include, but are not limited to, one or more of display devices, loudspeakers, sound and mechanical feedback generators, light emitters, or the like, keyboard, mouse, touch sensitive pads, optical sensors, computer vision devices, eye trackers, motion and gesture detection devices, head-mounted devices, tactile interfaces, implantable interfaces, and the like. Output devices 102 and input devices 103 provide a user interface allowing the user to interact with the virtual environment 104 for building interactive virtual toy construction models and subsequently interactively playing with the constructed model. The system 100 allows to not only build and inspect an appearance of a virtual model, but also to create an interactive model, explore its functionality in an interactive virtual environment, and/or interactively play with it. The user may also add further passive and interactive models to construct an entire interactive virtual world. Building and playing interaction modes may even be combined in the same user session, thereby allowing for a playfully educational user experience. According to a particularly advantageous embodiment the system may also be used as a game creation system, where a user may create interactive challenges and tasks for a player 99, which may be constructed in the form of interactive virtual toy construction models placed in one or more virtual world scenes, and which may be combined in a game for virtual game play.

The interactive virtual environment 104 has a coordinate system for defining positions of virtual objects with respect to each other. The coordinate system may have a reference plane, such as a horizontal reference plane 110 with horizontal directions being oriented parallel to the horizontal reference plane 110 and vertical directions being oriented perpendicular thereto. The virtual environment may comprise background elements 112, such as a landscape, vegetation, buildings, and/or any other objects defining a background topography of the virtual environment 104.

The virtual environment 104 provides virtual toy construction elements 115, 116. All virtual toy construction elements 115, 116 may have a shape and coupling members as may be found in corresponding physical toy construction elements. The virtual toy construction elements 115, 116 are thus configured for building a virtual toy construction model. Using any suitable input method associated with the one or more input devices 103 a user may instruct the system 100 to build any desired virtual toy construction model from the virtual toy construction elements 115, 116 provided by the virtual environment 104. For example, a user may use one or more input devices 103 of the system 100 to select and move virtual toy construction elements 115, 116 so as to position them with respect to each other, and to engage their coupling mechanism, thereby defining a virtual toy construction model. Furthermore according to some embodiments, a user of the system 100 may import data defining previously constructed virtual toy construction models in terms of the virtual toy construction elements 115, 116 included in the model, their relative position, and their connectivity with respect to each other. Examples of virtual toy construction models, which are all constructed from passive virtual toy construction elements 115 are seen in FIG. 5 as decorative models 118 (pavilion, torches, animal), a tower 119 with a treasure chest on top, and a platform 120, all resting on the reference level 110 of the virtual environment 104 as here visualized by the shadows projected onto the reference plane 110.

A virtual toy construction model typically includes a plurality of virtual toy construction elements 115, 116, such as two or more virtual toy construction elements, which are directly or indirectly connected to each other. The connectivity is determined by the connection of the virtual toy construction elements to each other through their respective coupling members. A direct connection may be established between adjacent virtual toy construction elements by engaging cooperating coupling members of the adjacent virtual toy construction elements to each other. An indirect connection may be established between virtual toy construction elements via directly connected intermediate virtual toy construction elements in the same toy construction model. Virtual toy construction elements in a virtual toy construction model may thus be directly and indirectly connected to each other. The term connectivity generally covers both direct connectivity by direct connections between adjacent virtual toy construction elements, and indirect connectivity by indirect connections via direct connections to intermediate virtual toy construction elements that are directly connected to each other. A virtual toy construction model may thus be defined as a fully connected set of virtual toy construction elements, wherein connectivity of the virtual toy construction elements may include direct and indirect connectivity. The term "connection" is here understood as representing a mechanical coupling between virtual toy construction elements corresponding to the mechanical coupling of physical toy construction elements.

The virtual environment may further provide an avatar 99 of a player allowing a user acting as a player to move around and to interact with the virtual environment 104, and in particular with the interactive toy constructions elements and models in the virtual environment 104. The user may control the avatar 99 using any suitable input method associated with the input devices 103.

The virtual toy construction elements 115, 116 may be grouped into different sets according to their properties. A first set of virtual toy construction elements defines passive virtual toy construction elements 115 corresponding in shape and coupling members to physical toy construction elements as already described above. The passive virtual toy construction elements take up virtual space corresponding to their pre-defined shape and size. The passive virtual toy construction elements 115 do not provide any interactive functional behavior beyond the coupling functionality representing the mechanical connection with other virtual toy construction elements 115, 116. The passive virtual toy construction elements 115 thus allow for building passive virtual models, such as the passive models 118, 119, 120 shown in FIG. 5, which may be placed in the virtual environment, and which may be gazed at and inspected by moving around in the virtual world, e.g. from a point of view following an avatar 99 controlled by the user. A second set of virtual toy construction elements defines interactive virtual toy construction elements 116. Just like the passive virtual toy construction elements 115, the interactive virtual toy construction elements 116 are configured for being connected to other virtual toy construction elements 115, 116 for building a virtual toy construction model. However, the interactive virtual toy construction elements 116 are further configured to provide interactive functionality beyond the mere coupling mechanics of passive virtual toy construction elements 115. As further detailed below, the interactive functional behavior of an interactive virtual toy construction element 116 may be imparted to all virtual toy construction elements that are directly or indirectly connected to it. The interactive functional behavior of an interactive virtual toy construction element 116 may thus be applied to an entire model to which it is connected. Thereby, a user of the system may create a virtual interactive object as a virtual toy construction model with an interactive behavior as determined by the functional behavior of the interactive virtual toy construction element included 116 in the model. The interactive virtual toy construction elements 116 are therefore in the following interchangeably also referred to as behavior toy construction elements, and in so far the toy construction elements refer to brick shaped toy construction elements, they may also be referred to as behavior bricks. However, the invention is not limited to brick shaped toy construction elements, as long as the virtual toy construction elements are adapted for being connected to each other in a modular manner for modular model building.

Advantageously, each of the virtual interactive virtual toy construction elements 116 may be configured to have a specific interactive behavior associated with it. Furthermore, multiple interactive virtual toy construction elements 116 may be connected so as to construct a combined interactive behavior based on a combination of their respective interactive behaviors. Thereby, a complex interactive behavior can be constructed from a combination of simple functional elements of multiple interactive virtual toy construction elements 116 in an easy and particularly intuitive manner. Consequently, a modular system for building virtual objects with complex interactive behavior is obtained that reflects the simplicity and intuitive modular building process of physical model building with physical toy construction elements. The combination may include a superposition of respective functionalities of the interactive virtual toy construction elements 116 that are combined, such as a superposition of two different motion patterns. Alternatively or in addition thereto, the combination may include linking elements of the interactive behavior logically together, e.g. to build a logical sequence of interactive behavior, such as a trigger condition activating a motion pattern. The combination may be created by directly connecting the interactive virtual toy construction elements 116 to each other, or indirectly connecting the interactive virtual toy construction elements 116 to each other, e.g. via a path of intermediate passive virtual toy construction elements that are directly connected to each other. As also further detailed below, the combined interactive behavior may be imparted to all virtual toy construction elements 115, 116 according to their connectivity. Advantageously, the combined functional behavior may thus be applied to an entire model constructed from passive and interactive virtual toy construction elements 115, 116 that are connected to each other. Thereby, a user of the system may easily create a virtual interactive object as a virtual toy construction model with a complex interactive behavior as determined by the combined functionality of multiple interactive virtual toy construction elements 116 included in the model.

The interactive behavior of an interactive virtual object, such as an interactive toy construction element or model, is activated by a stimulus received at a stimulus input of the interactive virtual object. The received stimulus may activate a response function producing a response at a response output of the interactive virtual object. The stimulus may be derived from an activating event, such as entering a particular operational mode, e.g. a switching to a play mode of the system, or entering a testing function within a building mode of the system. The stimulus may also be derived from a response output provided by one or more other interactive virtual construction elements. For example a response output of a first interactive virtual toy construction element may be linked to the stimulus input of a second interactive virtual toy construction element, wherein the second interactive virtual toy construction element is configured to activate its response output in response to receiving at its stimulus input a pre-determined response output state from the first interactive virtual toy construction element. The stimulus required for activating a response may be pre-defined, e.g. the response may be activated by default upon entering a certain operational mode, such as upon entering a playing mode or a testing mode. Alternatively or in addition thereto, the stimulus required for activating a response may be configurable, such as user-configurable, e.g. in a building mode. Configuring the activation mechanism of an interactive virtual toy construction element may include selecting one or more activation conditions, setting threshold values or parameter ranges for activation, selecting activation input from specific sources, and setting and/or selecting one or more activation conditions that may be required to be fulfilled one at a time (e.g. multiple conditions grouped in a logical "OR" list) or in combination (e.g. multiple conditions grouped in a logical "AND" list). The system may further include user interface elements that facilitate prompting for and receiving configuration input from a user.

The term "link" as used herein is understood as a functional association between interactive virtual toy construction elements. An example of a simple link may be a trigger linked to an action, wherein activation of the trigger causes activation of the action. A link between interactive virtual toy construction elements may be configured independent of connectivity. An example for a link that is independent of connectivity may be a remote trigger attached to a first model, where a response output of the trigger is linked to the stimulus input of an action connected to a second model that is separate from the first model. However, connectivity may also be used as a parameter for defining or configuring specific links (e.g. "all connected", "directly connected", "indirectly connected"). For example, an interactive virtual toy construction model may, besides a number of passive virtual toy construction elements, also include interactive virtual toy construction elements for implementing a rotation action, a sound action, and a proximity trigger, which is activated when an activating object is detected within a distance range from the proximity trigger, and wherein the proximity trigger is only directly connected to the sound action. By defining a link only between the proximity trigger and the sound action, e.g. based on the direct connection between the two, the generation of sound output from the interactive model may be configured to only occur when the activating object approaches the interactive model, whereas the rotation movement of the model may be activated independent of the proximity trigger, e.g. upon entering a play state, so as to cause the interactive model to rotate continuously.

Advantageously according to some embodiments, the system 100 may comprise a building mode for constructing interactive virtual toy construction models from passive and interactive virtual toy construction elements 115, 116. The building mode may further provide configuration elements and/or indicators on the user interface, which are adapted for configuring the interactive virtual toy construction elements. The building mode may further provide testing components through the user interface, which are adapted for testing the functional behavior of interactive virtual toy construction elements, their configuration, and of the models constructed from these elements. Further advantageously, the system may be configured for multiple users to join the same virtual environment for building virtual toy construction models together, and/or together create a video game by constructing interactive challenges and tasks in the form of interactive virtual toy construction models placed in one or more virtual world scenes. The one or more users may then play with the one or more interactive models or game, and/or share the interactive one or more models or game, e.g. through networked services, for other users to play with the interactive virtual toy construction models or games.

Advantageously according to some embodiments, the system may further comprise a playing mode for playing with the interactive virtual toy construction models constructed from passive and interactive virtual toy construction elements 115, 116. According to a particularly advantageous embodiment, the playing mode may allow a user to play a video game that has been created using the system. Further advantageously, the playing mode may be configured to allow multiple users to join the video game that has been created using the system and play the video game together.

Figure 6:
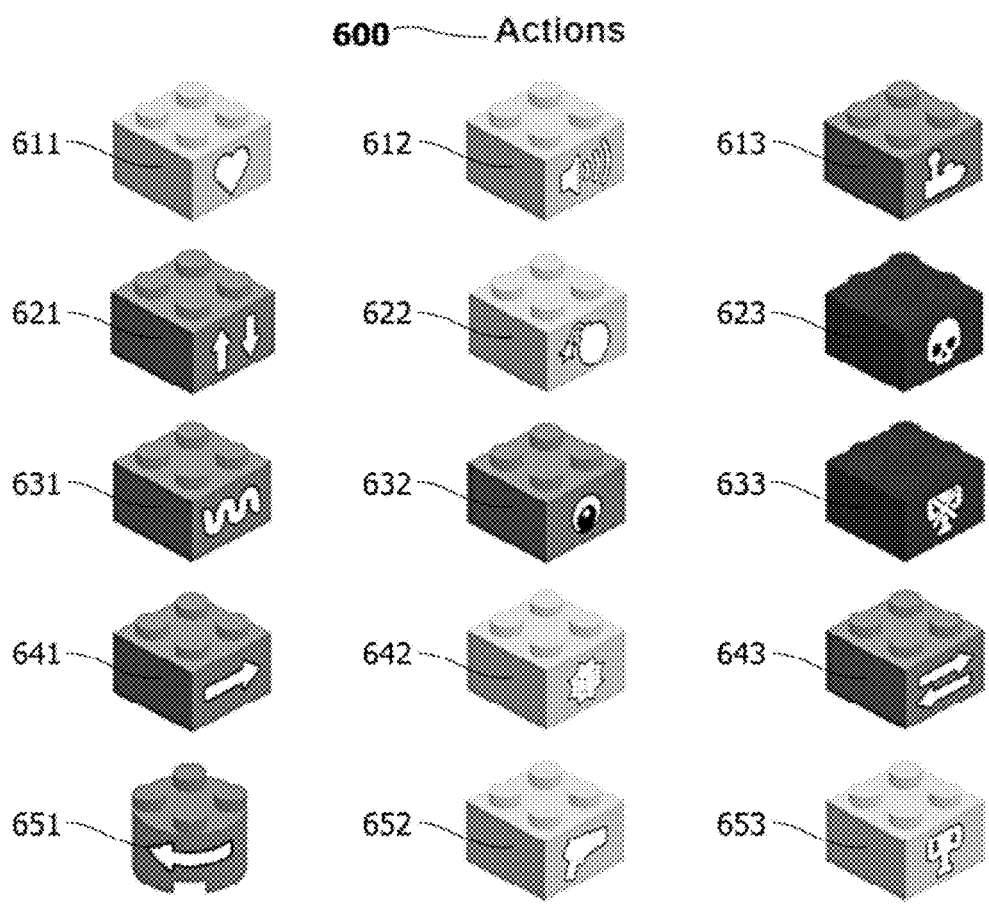
FIG. 6 shows behavior toy construction elements of a system for building interactive virtual toy construction models, such as the system of FIG. 5, each behavior toy construction element representing a specific action associated therewith.
Figure 7:
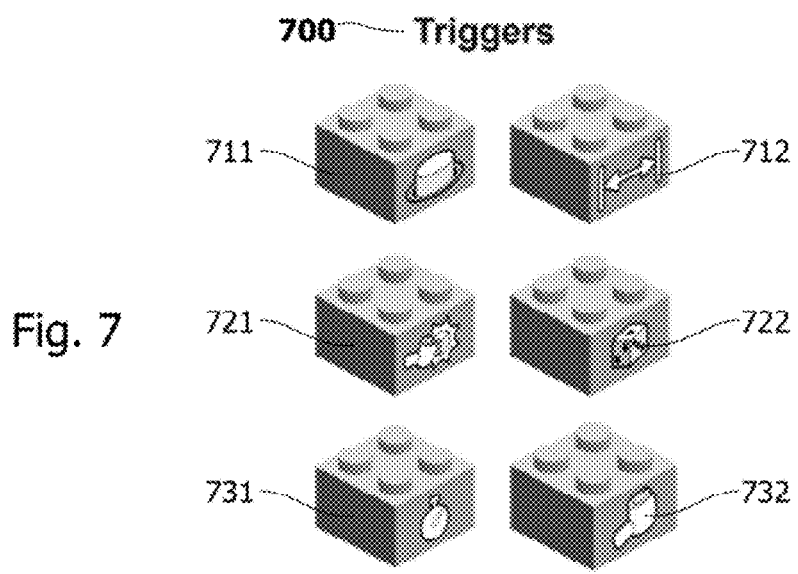
FIG. 7 shows behavior toy construction elements of a system for building interactive virtual toy construction models, such as the system of FIG. 5, each behavior toy construction element representing a specific trigger associated therewith.

Reference is now made to FIGS. 6 and 7 showing examples of interactive virtual toy construction elements 116, which are grouped into so-called actions 600 and triggers 700. The actions 600 comprise interactive virtual toy construction elements 6xx implementing an action behavior, called action bricks: responsive to receiving a stimulus at a stimulus input, the action bricks activate an action response at the response output, such as motion, sound, and/or visual effects. By connecting an action brick 6xx to a virtual toy construction model the corresponding action behavior may be applied to the entire model.

The triggers 700 comprise interactive virtual toy construction elements 7xx, called trigger bricks implementing a trigger behavior: responsive to receiving a stimulus at the stimulus input, the trigger bricks activate a trigger response at the response output. By connecting a trigger brick 7xx to a virtual toy construction model the corresponding trigger behavior may be applied to the entire model.

A trigger brick 7xx may be linked as an activation trigger to the stimulus input of one or more other interactive virtual toy construction elements. Activation of the trigger brick may thus be used to cause activation of the interactive behavior of the one or more interactive virtual toy construction elements to which it is linked, subject to fulfilling a trigger condition of the trigger brick. As also mentioned above, in some embodiments, linking the response output of one interactive toy construction element to the stimulus input of one or more other interactive toy construction elements may be independent of connectivity. Thereby the interactive behavior of a first interactive toy construction model may be linked to the interactive behavior of a second interactive toy construction model that is separate from the first interactive toy construction model. For example, a trigger behavior applied to a first model may be linked to activate an explosion behavior applied to a second model that is located remote from the first model in the virtual environment. The first model may then be used as a remote trigger for exploding the second model.

By way of example, a set of behavior bricks including action bricks 6xx and trigger bricks 7xx will now be described in more detail. However, the skilled person will understand that numerous other interactions may be implemented and the conceivable actions and triggers that may be implemented by interactive virtual toy construction elements are not limited to the activation input, action and trigger output, and/or configuration options mentioned here. Also, while a single specific representation of a virtual toy construction element is chosen as a carrier for the interactive functionalities implemented therein, any form and shape of a virtual toy construction element may be used as a carrier for the interactive functionality, as long as the form and shape of the virtual toy construction element is compatible with the other virtual toy construction elements of the virtual toy construction system for the purpose of connecting the virtual toy construction elements to each other and building virtual toy construction models.

The set of actions 600 as shown in FIG. 6 may include multiple action bricks 611, 612, 613, 621, 622, 623, 631, 632, 633, 641, 642, 643, 651, 652, 653, each action brick implementing a different respective action response, which may be activated in response to any suitable activation event registered at the stimulus input of the action brick. An action response may be provided as user-perceptible output at the user interface of the system, through any one or more of the output devices 102.

Animation brick 611 may implement movements and sound output mimicking activity of an animate being, which may be pre-configured and/or user-configurable to represent a pet, a cartoon character, a wild animal, a monster, a ghost, an alien, a robot, or the like.

Sound brick 612 may implement sound output, which may be configured to select or generate a specific audio sequence, such as speech, ambient sounds, music, context specific sounds, in response to an activating stimulus.

Control brick 613 may implement a motion control output, in direct response to operation of control elements of one or more input devices 103 at the user interface, such as keyboard input, joystick input, game controller input, visually detected and/or touch-based gesture input, acceleration and/or gyroscopic sensor readings. By connecting a control brick to a virtual toy construction model, the model can be converted to behave as a player's avatar, which moves around the virtual environment in response to control input from a user operating corresponding player control elements of the system.

Elevator brick 621 may implement vertical up and down movement output in response to an activating stimulus, which may be configured, e.g. with respect to the number of consecutive up and/or down movements, the elevation height of the movement, speed, acceleration, or similar parameters.

Explosion brick 622 may implement an explosion action in response to receiving a trigger stimulus. The explosion action may be configured, e.g. with respect to the strength of the explosion blast.

Hazard brick 623 may implement a weakening, toxic, or even killing effect affecting one or more of the players or animate beings in the virtual environment, typically in response to a trigger condition input. Configuration may determine the level and/or duration of the hazard affecting the player, a range of the hazardous effect, whether or to which extend the hazardous effect may be screened and/or healed, consumption or not of the hazardous effect, etc.

Hovering brick 631 may implement a hovering movement output, which may be configured, e.g. with respect to the hovering height, and an amplitude of an optional oscillatory up-and-down bopping movement or any horizontal movements superimposed to the hovering movement, resilience of the hovering force with respect to simulated vertical forces, etc.

Tracking brick 632 may implement a tracking motion output, which may be configured, e.g. to track a specified object, which may be configured, e.g. with respect to the type of tracking motion performed, and/or with respect to delay, speed and/or acceleration of the tracking response to mimic a desired tracking behavior. For example, the tracking motion may be a rotational motion around a vertical axis for orientation of the interactive object along a line of sight to a target object, such as a player's avatar. In another example, the tracking behavior may include a following motion, where the interactive object not only is oriented, but also moves towards the specified target object. Parameters for the delay, speed and/or acceleration of the response may configure the motion for mimicking inertia in the tracking behavior, where a slower response makes it easier for the targeted object to dodge and escape the tracking, whereas a faster response makes it more difficult.

Game lost brick 633 may implement an end-of-game state output in a virtual game environment where a player loses the game, in response to detecting fulfilment of a "LOOSE" condition at the stimulus input.

Transport brick 641 may implement a horizontal movement along a direction as indicated by an arrow on the side of the brick, which may be configured, e.g. with respect to length of travel, and speed and/or acceleration of the movement.

Pick-up brick 642 may implement the possibility for a player to pick up game assets in a game, in response to an activating stimulus. The pick-up brick may be configured, e.g. with respect to the type of asset made available, the amount of asset gained (or lost) by the pick-up, etc.

To-and-fro brick 643 may implement an oscillatory horizontal to-and-fro movement, which may be configured, e.g. with respect to the length of the to-and-fro movement, speed and/or acceleration, phase angle of the oscillation, etc.

Rotation brick 651 may implement a rotational movement around a pre-determined axis of rotation, such as a vertical axis of rotation, which may be configurable, e.g. with respect to angular speed and/or acceleration, and with respect to orientation and location of the axis of rotation with respect to a reference point in or on the rotation brick 651. For example, the axis of rotation may be pre-configured to pass through the center of the brick. Furthermore, the rotation may be pre-configured to occur around a vertical axis, wherein a positive value for the angular speed may denote rotation in a first direction (e.g. "clockwise"), and a negative value for the angular speed may denote rotation in a second direction opposite to the first direction (e.g. "anticlockwise").

Gun brick 652 may implement a shooting output, which may be configurable, e.g. with respect to the type of projectile or beam emitted by the gun, with respect to range and repetition of the shooting action, and/or with respect to the damage inflicted on the target by a hit.

Game won brick 653 may implement an end-of-game state output in a virtual game environment where a player wins the game, in response to detecting fulfilment of a "WIN" condition at the stimulus input.

The set of triggers 700 as shown in FIG. 7 may include multiple trigger bricks 711, 712, 721, 722, 731, 732, each trigger brick implementing a different respective trigger output, which may be activated in response to any suitable activation event registered at the stimulus input of the trigger brick.

Button brick 711 may implement a trigger state output in response to a switching condition registered at the stimulus input, which may be configurable e.g. with respect to the type and duration of the switching function and trigger state output, such as flipping between an on and off state, switching a trigger output state from a normally off state to a temporary on state, switching a trigger output state from a normally on state to a temporary off state, duration of providing the trigger state output, dialing through a list of more than two trigger states, a number of trigger states selectable by consecutive activation of the switch, etc.

Proximity brick 712 may implement a trigger output to occur as soon as an activating object, such as a player's avatar, is in proximity of an object to which the proximity trigger behavior is applied, wherein proximity may be determined according to a distance of the activating object from a reference point of the proximity brick. The proximity brick may be configurable, e.g. with respect to the object or objects that may activate the trigger behavior, or with respect to the range of distances between the activating object and the proximity brick that cause activation of the trigger state output.

Pick-up trigger brick 721 may implement generation of a trigger output activated by registering one or more pick-up actions occurring elsewhere in the virtual environment, which may be configurable with respect to the pick-up actions required to activate the trigger output, such as which or how many of one or more available pick-up actions need to be performed by a player's avatar in order to activate the trigger output.

Random number brick 722 may implement the generation of a random number output, in response to receiving an activating stimulus at the stimulus input. The random number brick may be configurable, e.g. with respect to the type and range of the number output, or even with respect to the random number generation algorithm used.

Timer brick 731 may implement a trigger output with a time delay that starts running upon activation of the timer brick, which may be configurable, e.g. with respect to the duration of the time delay.

Touch brick 732 may implement a trigger output to occur as soon as a player avatar touches an object to which the touch trigger behavior is applied, which may be configurable, e.g. with respect to a minimum duration of touch activation required before the trigger output is generated.

Examples

Figure 8:
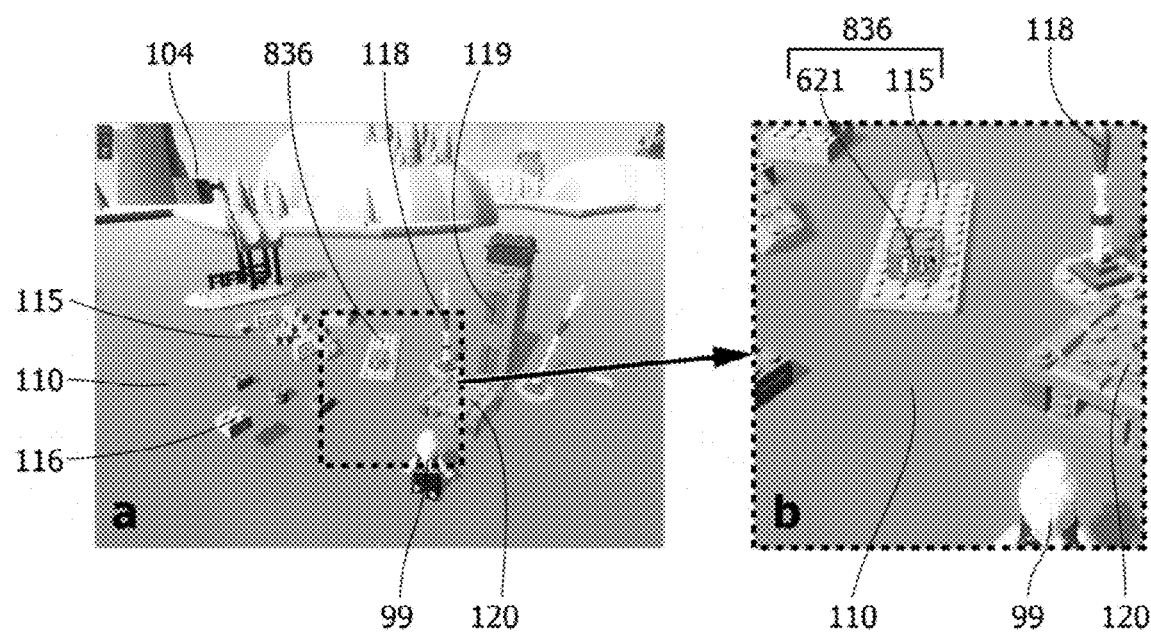
FIG. 8 shows an example of building an interactive toy construction model using a system for building interactive virtual toy construction models, such as the system of FIG. 5, in a building mode.
Figure 9:
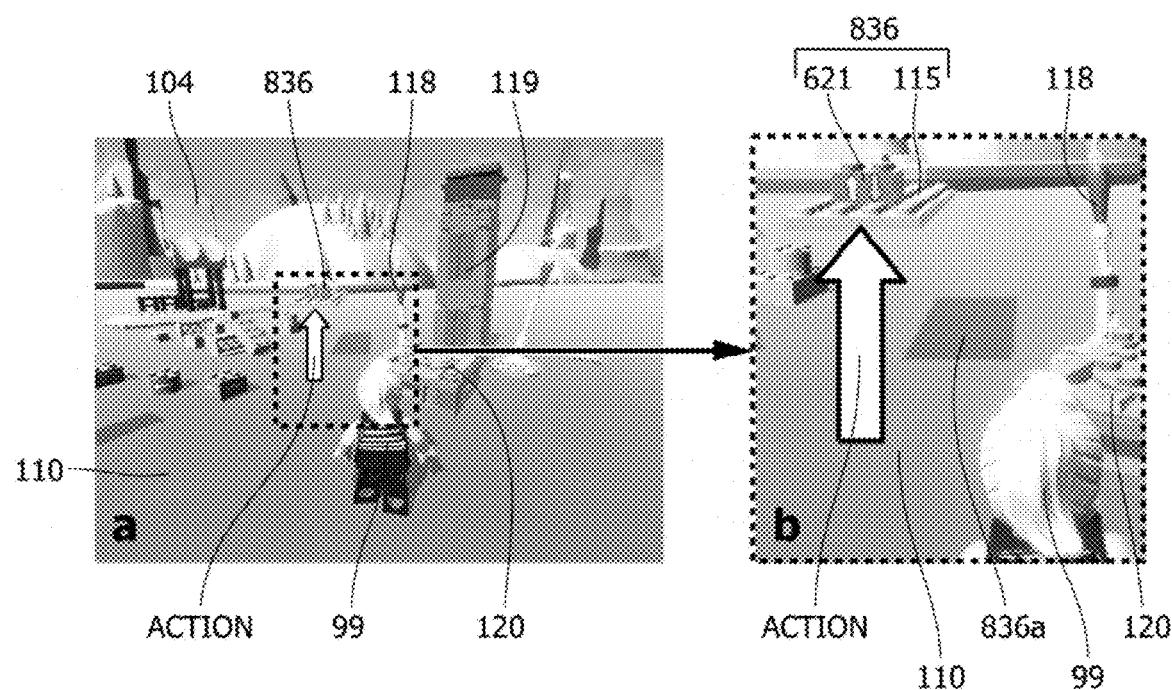
FIG. 9 shows an example of playing with an interactive toy construction model using a system for building interactive virtual toy construction models, such as the system of FIG. 5, in a playing mode.

Turning to FIGS. 8 and 9, an example of building and playing with an interactive toy construction model using an embodiment of a system according to the invention, such as a system as shown in FIG. 5, is now described. The system is configured to provide a virtual environment 104 in a first operational mode, in the following referred to as building mode, which is mainly adapted for building and configuration operations to be performed by a user. FIG. 8 shows the system in the building mode, wherein insert (b) shows an enlarged view of a central portion of the view (a) of the virtual environment 104 as marked by the broken line frame. A player's avatar 99 may be used as a reference mark for a point of view for presenting a scene of the virtual environment to the user. The avatar may be configured to merely watch the building operations when the system is in the building mode. Alternatively, the avatar may be configured to participate in the building operations in order to enhance the interactive experience. The system is further configured to provide the virtual environment 104 in a second operational mode, in the following referred to as playing mode, which is mainly adapted for a user to playfully interact with the virtual environment, e.g. by means of a player's avatar 99. FIG. 9 shows the system in the playing mode, wherein insert (b) in FIG. 9 shows an enlarged view of a central portion of the view (a) of the virtual environment 104 as marked by the broken line frame.

The virtual environment 104 has a horizontal reference plane 110 wherein horizontal directions are parallel to the reference plane 110, and vertical directions are perpendicular to the reference plane 110. The virtual environment may further provide a background landscape, defining a topography of the virtual environment 104. The virtual environment 104 comprises virtual toy construction elements 115, 116, here shown as brick shaped virtual toy construction elements 115, 116. Each of these virtual bricks 115, 116 have stud and cavity type coupling elements for connecting the virtual bricks 115, 116 to each other. The virtual bricks 115, 116 include a set of passive virtual bricks 115 and a set of interactive behavior bricks 116 with functionalities as already described above. The set of behavior bricks 116 may comprise any of the action bricks 6xx and trigger bricks 7xx with functionalities as also described above. The virtual environment 104 may further comprise virtual toy construction models 118, 119, 120 previously constructed from passive bricks 115, such as decorative models 118, a tower with a treasure chest 119, and a platform 120.

The enlarged inset (b) in FIG. 8 shows the construction of an interactive virtual toy construction model 836 from a combination of passive and interactive bricks 115, 116 connected to each other. The interactive virtual toy construction model 836 comprises a passive plate-shaped brick 115 resting on the reference level 110, and an elevator brick 621. Elevator brick 621 has a vertical movement functionality as described above with reference to FIG. 6, wherein the vertical movement output is configured to be activated by default as soon as the system enters playing mode. Elevator brick 621 is connected to a top side of the plate-shaped brick 115 by means of cooperating coupling elements. By connecting the behavior brick 621 to the passive plate-shaped brick 115, the functionality of the behavior brick is imparted to the passive plate-shaped brick 115, thereby turning the entire virtual toy construction model 836 into an interactive virtual toy construction model exhibiting the interactive behavior as defined by and configured in the behavior brick 621. Upon entering the playing mode the action response is activated as indicated by the block arrow in FIG. 9. As best seen in insert (b) of FIG. 9, the entire interactive virtual toy construction model 836 starts moving upward in a vertical direction as indicated by the block arrow and the shadow 836a of the model 836 projected onto the reference plane 110. In the example of FIGS. 8 and 9 the avatar 99 merely observes the scene, but does not directly interfere with the interactive object 836 thus created.

Figure 10:
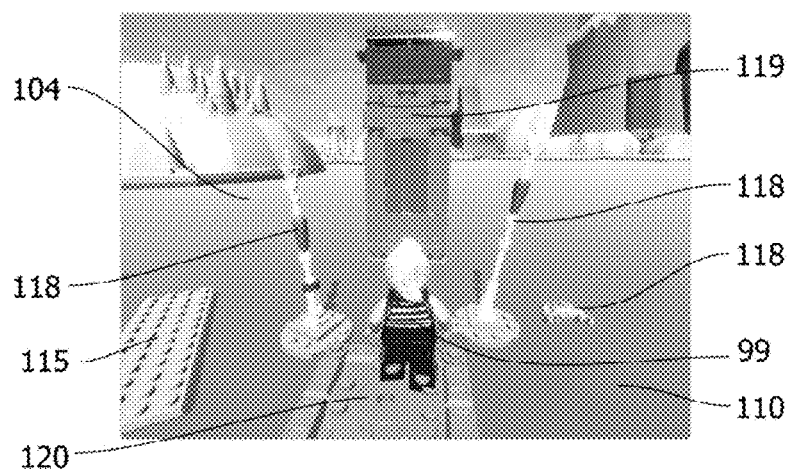
FIG. 10 shows an example of modifying an interaction behavior of a virtual toy construction model, specifically the behavior of the virtual toy construction model when the system is in a playing mode before modification.
Figure 11:
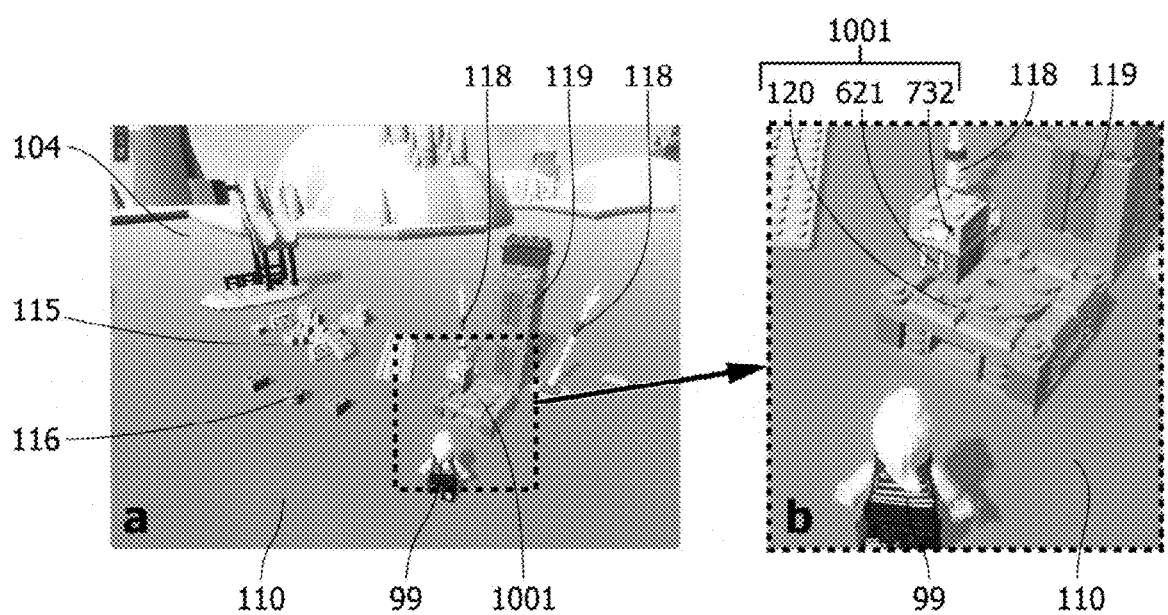
FIG. 11 shows an example of modifying an interaction behavior of a virtual toy construction model, specifically when applying the modification to the virtual toy construction model when the system is in a building mode.
Figure 12:
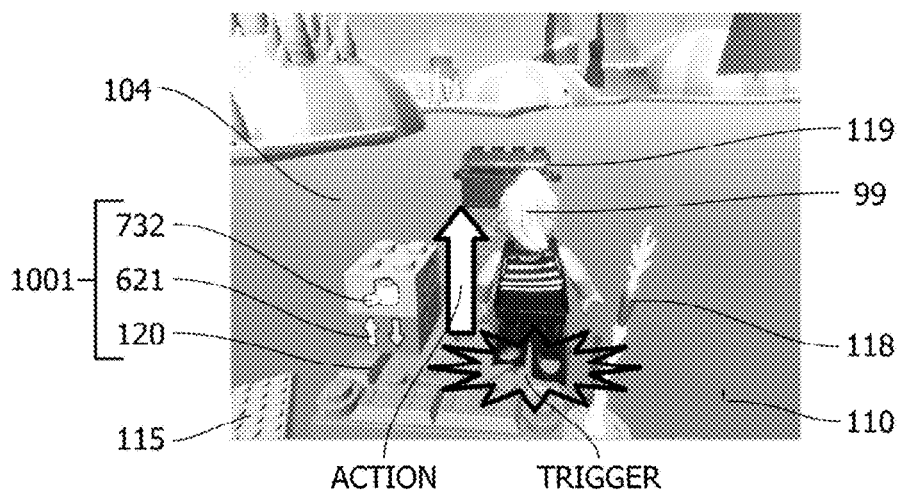
FIG. 12 shows an example of modifying an interaction behavior of a virtual toy construction model, specifically the behavior of the virtual toy construction model when the system is in a playing mode after the modification.

FIGS. 10-12 show a further example of modifying an interaction behavior of a virtual toy construction model, wherein FIGS. 10 and 12 show the behavior of the virtual toy construction model when the system is in a playing mode before and after the modification, respectively, and wherein FIG. 11 shows applying the modification to the virtual toy construction model when the system is in a building mode. The scene view seen in FIG. 10 shows the same virtual environment 104 as already discussed above with respect to FIGS. 5, 8, and 9 with a background landscape, decorative models 118, a tower 119 with a treasure chest on top, and a platform 120. All models are created from passive virtual toy construction elements 115, such as the plate-shaped brick also seen in the scene view of FIG. 10. The scene is viewed from the point of view of a third person following the player's avatar 99, which in this scene has jumped onto the platform, contacting the top thereof. However, since the platform is constructed from passive bricks 115, no interactive behavior is associated with the platform 120. FIG. 11 shows the virtual environment 104 in a building mode with a background landscape, passive bricks 115, interactive behavior bricks 116, and virtual toy construction models as already described above with respect to FIG. 8 above. The view (a) of FIG. 11 shows the scene in an overview perspective following behind the avatar 99, wherein insert (b) in FIG. 11 shows an enlarged view of a central portion of the view (a) of FIG. 11 as indicated by the broken line frame. The scene of FIG. 11 further comprises an interactive toy construction model 1001, which has been constructed by connecting a combination of interactive behavior bricks 116 to the passive toy construction model 120 resting on the reference plane 110 of the virtual environment 104. More particularly, the passive platform model 120 has been modified by connecting an elevator brick 621 directly to the top of the platform model 120. However, in contrast to the model 836 of FIGS. 8 and 9, the elevator action is now activated subject to fulfilment of an activation condition in the form of a touch trigger brick 732 connected to the top of the elevator brick 621. By connecting the touch trigger brick 732 to the top of the elevator brick 621, the touch trigger brick 732 is also indirectly connected to the platform model 120 via the intermediate of the elevator brick 621.

By connecting the elevator brick 621 to the platform model 120, the elevator behavior may be imparted to all virtual toy construction bricks of the platform model 120. Furthermore, since the touch trigger brick 732 is also connected to the elevator brick, the touch trigger brick 732 also inherits the elevator behavior. By connecting the touch trigger brick 732 via the elevator brick 621 to the platform, the touch trigger behavior may also be imparted to the elevator brick and to all virtual toy construction bricks of the platform model 120. Thereby an interactive virtual toy construction model 1001 of an elevator platform is constructed. Upon activation of the action response, the elevator platform model 1001 performs a vertical movement as defined by and configured in the elevator brick 621, wherein the vertical movement action may be triggered in response to a player's avatar 99 touching the elevator model 1001. The interactive behavior of the modified platform is best seen in FIG. 12 showing the scene in playing mode in a similar view as in FIG. 10, and where the avatar 99 has been controlled to jump onto the platform 120 contacting the top thereof. While the platform 120 in FIG. 10 does not change position, the modified elevator platform 1001 now detects the avatar touching the top of the platform as indicated in FIG. 12 by the star labelled "TRIGGER". The trigger behavior as defined by and configured in the touch trigger brick 732 is linked to the vertical movement behavior as defined by and configured in the elevator brick 621. More specifically, the trigger response of the touch trigger brick 732 may be provided as an activating stimulus to the elevator brick 621. As a consequence, the detected TRIGGER event activates the vertical movement behavior of the interactive elevator platform model 1001, and the elevator model 1001 starts moving vertically upward away from the reference plane 110, thereby carrying the avatar 99 to the top of the tower 119 as evident from the relative position of the elevator model 1001 and the avatar 99 with respect to the treasure chest on top of the tower 119. Conceivably, also the treasure chest can be converted into an interactive item, e.g. by placing a pick-up action brick 642 inside the treasure chest, which may be configured to be activated as soon as the avatar 99 reaches the treasure chest by means of the flying elevator platform 1001. Thereby, a modular system for constructing arbitrary interactive worlds in an intuitive and easy manner is achieved.

Advantageously, the system may be used by a user, e.g. in a building mode, to create an interactive video game. The system may then be used by the user, e.g. in a playing mode, to play the interactive video game. Further advantageously, a user may also share the created game for other users to play the interactive video game. Advantageously according to some embodiments, the system may be adapted to provide the virtual environment 104 as a multiple user environment, wherein multiple users, each user being represented by a respective player's avatar 99, may join the same virtual environment 104 in the building mode to collaborate in building and configuration operations. Furthermore, the system may also be adapted to provide the virtual environment 104 as a multiple user environment allowing multiple users to join as players in the playing mode to playfully interact with the virtual environment 104 and other players. In some embodiments, the virtual environment 104 may be implemented on the basis of a game engine software, such as the Unity game engine available through Unity Software Inc., San Francisco, USA.

What is claimed is:

1. A system for constructing an interactive virtual model, the system comprising a processing unit, one or more output devices, and one or more input devices, wherein the processing unit is operatively coupled to the input and output devices so as to provide a user interface to a user of the system;

wherein the processing unit comprises a processor device and memory means, the memory means comprising programmed instructions, which when executed by the processor device cause the system to produce an interactive virtual environment configured to allow the user to interact with the virtual environment through the user interface, the virtual environment comprising a plurality of virtual construction elements, wherein the virtual construction elements are connectable to each other so as to construct a virtual model;

wherein a first one of the virtual construction elements carries a first interactive behavior, wherein the first virtual construction element is configured to receive a stimulus at a stimulus input thereof, and responsive to receiving said stimulus to generate a response at a response output thereof, according to a first response function;

wherein a second one of the virtual construction elements does not carry the first interactive behavior; and wherein the first virtual construction element is configurable to impart the first interactive behavior to the second virtual construction element when the first and second construction elements are connected to each other.

2. The system according to claim 1, wherein the second one of the virtual construction elements carries a second interactive behavior, wherein the second virtual construction element is configured to receive a stimulus at a stimulus input thereof, and responsive to receiving said stimulus to generate a response at a response output thereof, according to a second response function.

3. The system according to claim 2, wherein the second response output of the second interactive toy construction element is linked to the first stimulus input of the first interactive toy construction element.

4. The system according to claim 2, wherein the second virtual construction element imparts the second interactive behavior to the first virtual construction element when the first and second construction elements are connected to each other.

5. The system according to claim 1, wherein each of the virtual construction elements comprises one or more coupling members for connecting said virtual construction element to one or more cooperating virtual construction elements.

6. The system according to claim 1, wherein the virtual construction model is defined as a group of connected virtual construction elements and information defining the relative positions and connectivity of the virtual construction elements in the group with respect to each other.

7. The system according to claim 1, wherein the plurality of virtual construction elements comprises passive virtual construction elements adapted for virtual model building, the passive virtual construction elements not carrying an interactive behavior.

8. The system according to claim 1, wherein the plurality of virtual construction elements comprises interactive virtual construction elements adapted for virtual model building, each of the interactive virtual construction elements carrying a respective interactive behavior.

9. The system according to claim 8, wherein the interactive virtual construction elements comprise one or more action elements, each action element carrying a respective action behavior configured to produce a user-perceptible output at the user interface in response to a stimulus received at the stimulus input of the action element.

10. The system according to claim 8, wherein the interactive virtual construction elements comprise one or more trigger elements, each trigger element carrying a respective trigger behavior configured to produce a trigger event/state at the response output of the trigger element in response to a stimulus received at the stimulus input of the trigger element.

11. A system for constructing an interactive virtual object in a virtual environment implemented in a computer, the computer comprising one or more input devices and one or more output devices allowing a user to interact with the virtual environment, wherein the virtual environment comprises a first virtual construction element carrying a first interactive behavior and a second virtual construction element not carrying the first interactive behavior, wherein the first and second virtual construction elements are connectable to each other by means of a coupling mechanism to form a combined virtual object, and wherein the first virtual construction element imparts the first interactive behavior to the combined virtual object when the first and second construction elements are connected to each other.

12. The system according to claim 11, wherein the second one of the virtual construction elements carries a second interactive behavior.

13. The system according to claim 12, wherein the second virtual construction element is configurable to provide a response according to the second interactive behavior as a stimulus to the first interactive behavior of the first interactive toy construction element, thereby linking the second interactive behavior to the first interactive behavior.

14. The system according to claim 11, wherein each of the virtual construction elements comprises one or more coupling members for connecting two or more virtual construction elements to each other.

15. The system according to claim 11, wherein the plurality of virtual construction elements comprises action elements, each action element carrying a respective action behavior configured to produce a user-perceptible output at the user interface, in response to a stimulus received at the action element.

16. The system according to claim 11, wherein the plurality of virtual construction elements comprises trigger elements, each trigger element carrying a respective trigger behavior configured to produce a trigger event or state, in response to a stimulus received at the trigger element.

17. A method for constructing an interactive virtual object in a virtual environment implemented in a computer, the computer being adapted to provide a user interface allowing a user to interact with the virtual environment, the method comprising the steps of:
  providing a first virtual object carrying a first interactive behavior, wherein the first virtual object is configured to receive a stimulus and to generate a response responsive to receiving said stimulus according to a first response function;
  providing a second virtual object not carrying the first interactive behavior,
  connecting the first and second objects to each other by means of a coupling mechanism to form a combined virtual object; and
  imparting the interactive behavior of the first virtual object to the combined virtual object when the first and second virtual objects are connected to each other.

18. The method according to claim 17, wherein the first virtual object is an interactive virtual construction element, or wherein the first virtual object is an interactive virtual construction model constructed from two or more virtual construction elements including a combination of one or more interactive virtual construction elements defining the first interactive behavior.

19. The method according to claim 17, wherein the second virtual object is a virtual construction model constructed from a plurality of virtual construction elements.

20. The method according to claim 17, wherein the method further comprises steps of:
  configuring the first virtual object to modify the first interactive behavior; and
  imparting the modified first interactive behavior to the combined virtual object.

21. The method according to claim 17, wherein the second virtual object carries a second interactive behavior different from the first interactive behavior, wherein the second virtual object is configured to receive a stimulus and to generate a response responsive to receiving said stimulus according to a second response function; the method further comprising steps of:
  configuring the second virtual construction element to provide a response according to the second interactive behavior as a stimulus to the first interactive behavior of the first interactive toy construction element, thereby linking the second interactive behavior to the first interactive behavior.

* * * * *